United States Patent
Miyaji et al.

(10) Patent No.: US 10,498,284 B2
(45) Date of Patent: Dec. 3, 2019

(54) MOTOR DRIVE CONTROLLER AND METHOD FOR CONTROLLING MOTOR

(71) Applicant: MINEBEA CO., LTD., Kitasaku-gun, Nagano (JP)

(72) Inventors: Shigeki Miyaji, Hamamatsu (JP); Takayuki Matsui, Toyohashi (JP); Tetsuya Seki, Fukuroi (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 15/070,695

(22) Filed: Mar. 15, 2016

(65) Prior Publication Data
US 2016/0276974 A1   Sep. 22, 2016

(30) Foreign Application Priority Data

Mar. 17, 2015 (JP) ................. 2015-053468

(51) Int. Cl.
*H02P 6/10* (2006.01)
*H02P 29/50* (2016.01)

(52) U.S. Cl.
CPC ..................... *H02P 29/50* (2016.02)

(58) Field of Classification Search
CPC ............ H02P 8/32; H02P 29/50; H02P 27/06
USPC ................................................... 318/400.23
See application file for complete search history.

(56) References Cited

U.S. PATENT DOCUMENTS

| | | | |
|---|---|---|---|
| 6,713,943 B1 * | 3/2004 | Matsuda | H02N 2/0025 310/317 |
| 2002/0101769 A1 * | 8/2002 | Garverick | G02B 6/266 365/200 |
| 2004/0066164 A1 | 4/2004 | Taka et al. | |
| 2005/0127789 A1 * | 6/2005 | Magnussen | H01L 41/0906 310/328 |
| 2006/0006762 A1 * | 1/2006 | Matsuzaki | H02N 2/004 310/317 |
| 2006/0138968 A1 * | 6/2006 | Bakre | H05B 41/295 315/209 R |
| 2006/0170383 A1 * | 8/2006 | Narumi | H02P 6/10 318/400.04 |
| 2008/0252240 A1 * | 10/2008 | Sugie | H02P 6/08 318/400.06 |

(Continued)

FOREIGN PATENT DOCUMENTS

| | | | |
|---|---|---|---|
| JP | S63-107498 A | 5/1988 | |
| JP | H01-218391 A | 8/1989 | |

(Continued)

OTHER PUBLICATIONS

Office Action dated Sep. 12, 2017 in the corresponding Japanese patent application No. 2015-053468.

*Primary Examiner* — Bickey Dhakal
*Assistant Examiner* — Gabriel Agared
(74) *Attorney, Agent, or Firm* — Carrier Blackman & Associates, P.C.; Joseph P. Carrier; Jeffrey T. Gedeon

(57) ABSTRACT

A motor drive controller includes: a control circuit that controls an AC current flowing in a motor; a frequency modulation unit that frequency-modulates a speed of the motor when the motor is driven at a predetermined speed; and a current effective value controller that decreases an effective value of the AC current flowing in the motor as the speed of the motor modulated by the frequency modulation unit becomes closer to a resonant frequency of the motor.

5 Claims, 10 Drawing Sheets

(56) References Cited

U.S. PATENT DOCUMENTS

| | | | |
|---|---|---|---|
| 2009/0153086 A1* | 6/2009 | Narumi | H02P 6/18 318/400.35 |
| 2010/0244760 A1* | 9/2010 | Anwar | G01R 31/025 318/490 |
| 2011/0219816 A1* | 9/2011 | Tanaka | H02P 6/18 62/498 |
| 2012/0192476 A1* | 8/2012 | Compton | F41G 11/003 42/84 |
| 2013/0063061 A1* | 3/2013 | Hanada | H02P 27/08 318/400.14 |
| 2013/0332944 A1* | 12/2013 | Kawabata | G11B 7/1376 720/695 |
| 2014/0210379 A1* | 7/2014 | Kato | H02P 6/15 318/139 |
| 2015/0002061 A1* | 1/2015 | Hatakeyama | H02P 6/18 318/400.06 |
| 2015/0168938 A1* | 6/2015 | Fujimoto | G05B 19/4163 700/160 |
| 2015/0318808 A1* | 11/2015 | Okubo | H02K 29/03 318/400.02 |

FOREIGN PATENT DOCUMENTS

| | | |
|---|---|---|
| JP | 06-245590 A | 9/1994 |
| JP | 2004-129399 A | 4/2001 |
| JP | 2011-239518 A | 11/2011 |

* cited by examiner

MOTOR DRIVE CONTROLLER AND METHOD FOR CONTROLLING MOTOR

BACKGROUND OF THE INVENTION

1. Field of the Invention

The present invention relates to a motor drive controller and a method for controlling a motor.

2. Description of the Related Art

In paragraph 0030 of JP-A-H06(1994)-245590, it is described that "noise generated from a pulse motor can be greatly reduced by periodically modulating a motor driving frequency in a constant speed rotation period."

In paragraph 0006 of JP-A-H06(1994)-245590, it is described that "when a pulse motor is driven at a steady speed (fo), the pulse motor is driven by superimposing a signal with a modulation width (Δf) varying in a period (1/fs) at the steady speed (fo)." In paragraphs 0022 to 0027 of JP-A-H06(1994)-245590, it is described that "setting ranges of the period (1/fs) and the modulation width (Δf) in which a good noise reduction effect is obtained."

When a stepping motor has a resonant frequency at a predetermined drive speed and the motor is driven at a speed close to the resonant frequency, there were problems that large vibration ripples occur based on a frequency modulation and abnormal noise (beat noise) occurs. There is also a problem that torque ripples occur due to the frequency modulation.

SUMMARY OF THE INVENTION

One of objects of the present invention is to provide a motor drive controller and a method for controlling a motor that can suppress abnormal noises or torque ripples generated in periodically modulating a driving frequency of the stepping motor.

According to an illustrative embodiment of the present invention, there is provided a motor drive controller including: a control circuit that controls an AC current flowing in a motor; a frequency modulation unit that frequency-modulates a speed of the motor when the motor is driven at a predetermined speed; and a current effective value controller that decreases an effective value of the AC current flowing in the motor as the speed of the motor modulated by the frequency modulation unit becomes closer to a resonant frequency of the motor.

According to another illustrative embodiment of the present invention, there is provided a motor drive controller including: a control circuit that controls an AC current flowing in a motor; a frequency modulation unit that frequency-modulates a speed of the motor when the motor is driven at a predetermined speed; and a current effective value controller that frequency-modulates an effective value of the AC current flowing in the motor with the same phase as a variation of the speed of the motor by the frequency modulation unit.

According to still another illustrative embodiment of the present invention, there is provided a method for controlling a motor, the method including: controlling an AC current supplied to the motor to frequency-modulate a speed of the motor when the motor is driven at a predetermined speed; and decreasing an effective value of the AC current flowing in the motor as the speed of the motor modulated by the frequency-modulation becomes closer to a resonant frequency of the motor.

DETAILED DESCRIPTION

Hereinafter, embodiment of the present invention will be described in detail with reference to the accompanying drawings.

Figure 1:
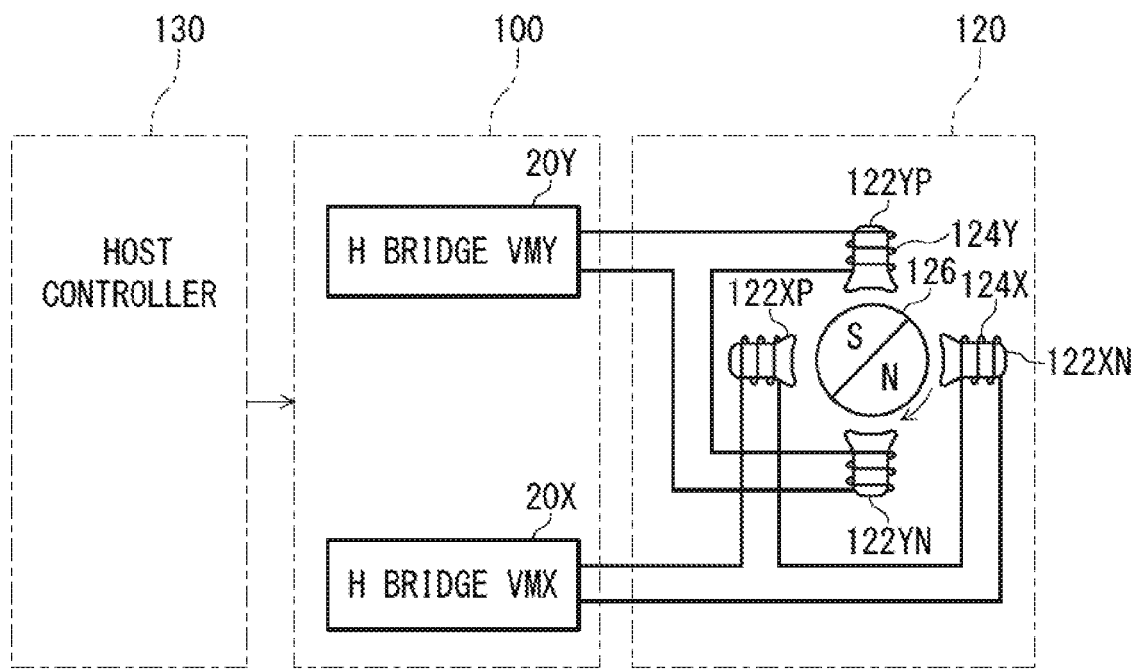
FIG. 1 is a diagram schematically illustrating a configuration of a motor drive controller according to an embodiment of the present invention.

FIG. 1 is a diagram schematically illustrating a configuration of a motor drive controller 100 according to an embodiment of the present invention.

In FIG. 1, a stepping motor 120 is a bipolar-type two-phase stepping motor, and includes a rotor 126 that has a permanent magnet and is rotatably provided and stators 122XP, 122XN, 122YP, and 122YN that are formed at four equal positions in the circumferential direction of the periphery of the rotor 126. The stators 122 XP and 122XN configure an X phase. The stators 122YP and 122YN configure a Y phase. Hereinafter, when each stator is not particularly distinguished from each other, there is a case of simply describing the stator 122

A winding wire is wound around each of the stators. Winding wires wound around the stators 122YP and 122YN are connected to each other in series and the winding wires are denoted together by "a stator winding wire 124Y." In the same way, winding wires wound around the stators 122XP and 122XN are connected to each other in series and the winding wires are denoted together by "a stator winding wire 124X."

A host device 130 outputs a speed command signal of commanding a rotation speed of the stepping motor 120. A motor drive controller 100 drives and controls the stepping motor 120 in response to the speed command signal. The motor drive controller 100 includes H bridge circuits 20X and 20Y that apply an X-phase voltage VMX and a Y-phase voltage VMY to the stator winding wires 124X and 124Y, respectively.

Figure 2:
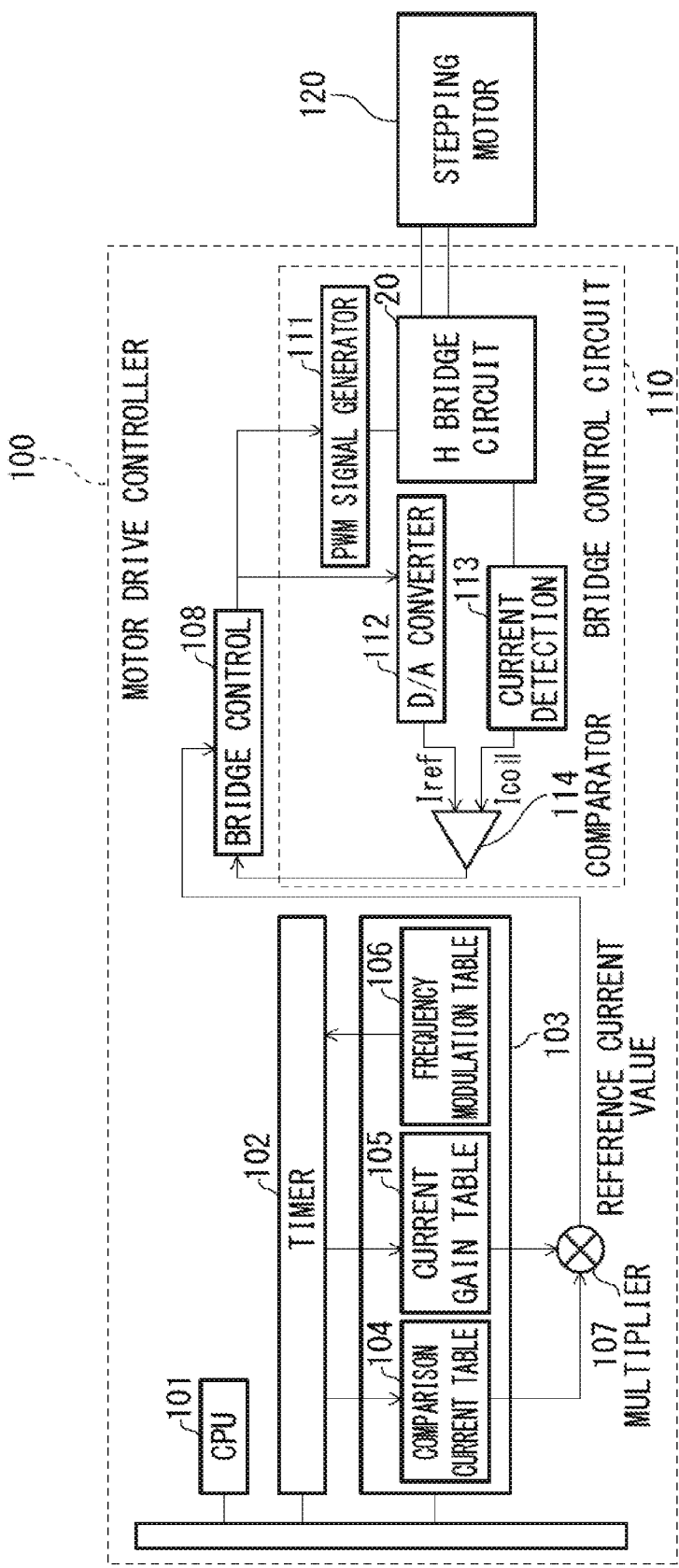
FIG. 2 is a detailed block diagram of the motor drive controller according to the embodiment of the present invention.

FIG. 2 is a detailed block diagram of a motor drive controller 100. FIG. 1 illustrates two sets of stator winding wires 124X and 124Y and two sets of H bridge circuits 20X and 20Y, but FIG. 2 illustrates one of the stator winding wires as a stator winding wire 124 and illustrates one of the H bridge circuits as an H bridge circuit 20.

A processor (central processing unit (CPU)) 101 mounted in the motor drive controller 100 controls each unit based on various tables or control programs stored in a read only memory (ROM) 103. A timer 102 measures time elapsed from the reset timing under control of the CPU 101. A bridge controller 108 controls each unit of a bridge control circuit 110 (control circuit) based on a command from the CPU 101, and thus controls AC current flowing in the stepping motor 120. A multiplier 107 is controlled by the CPU 101 and multiples a parameter by a gain, and outputs the result of the operation.

A comparison current table 104, a current gain table 105, and a frequency modulation table 106 are stored in the ROM 103 in the motor drive controller 100 according to the embodiment of the present invention.

In the comparison current table 104, a sequence of comparison current values in a micro step is stored. The micro step means a unit of control for accurately controlling the stepping motor 120 than a control based on a basic step angle of 90 degrees of the stepping motor 120. Compared with a case in which a motor is driven in a full step, it is possible to effectively reduce vibration or noise generated at a low speed by driving the stepping motor 120 in the micro step. Here, the comparison current values of the comparison current table 104 are stored and configured to form a sinusoidal wave as a whole.

In the current gain table 105, a sequence of a current gain value when a reference current value Iref is calculated by multiplying the comparison current is stored. The current gain changes an effective value of an AC current flowing in the motor and the sequence of the current gain value becomes a value varying in a sinusoidal wave synchronized to a frequency modulation which will be described later. An effective value of the AC current flowing in the motor can be controlled by the current gain table 105, which serves to operate the CPU 101 as a current effective value controller.

In the frequency modulation table 106, a sequence of a period of the micro step is stored. Here, the sequence of the period of the micro step becomes a value varying in a sinusoidal wave because the motor drive controller 100 performs a frequency modulation on a speed of the motor. When the stepping motor 120 is driven at a predetermined rotation speed by the frequency modulation table 106, which serves to operate the CPU 101 as a frequency modulation unit, a frequency modulation is performed on the rotation speed. As a result, a noise of the stepping motor 120 can be greatly reduced.

Figure 9A:
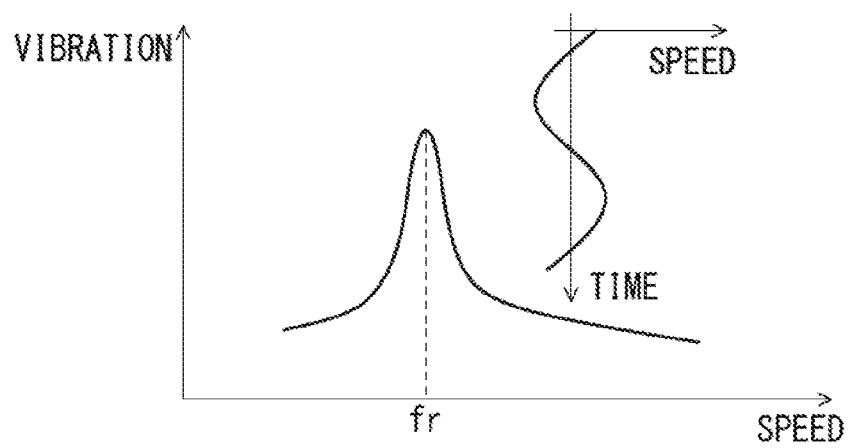
FIGS. 9A and 9B are diagrams illustrating causes of vibration and abnormal noise according to a comparative example.
Figure 9B:
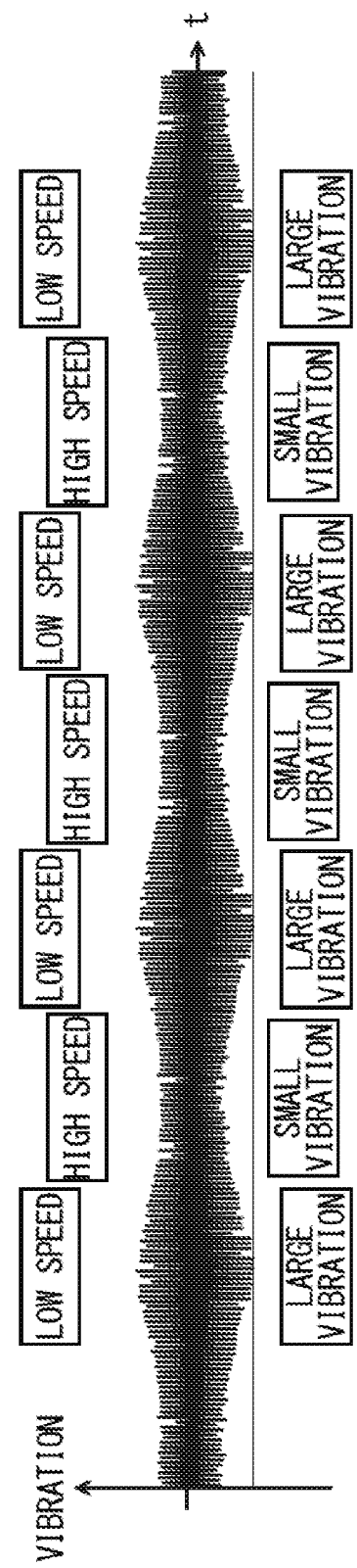

Hereinafter, the frequency modulation of the motor drive controller 100 in a comparative example and the embodiment will be described. In the comparative example, while performing the frequency modulation based on the frequency modulation table 106, a comparison current of a micro step is outputted as a reference current value Iref. An example of a waveform at this time is illustrated in FIGS. 9A and 9B which will be described later.

On the contrary, the motor drive controller 100 of the embodiment multiplies a comparison current of the micro step by a current gain synchronized to the frequency modulation while performing the frequency modulation based on the frequency modulation table 106 and outputs the multiplied current as a reference current value Iref.

The bridge control circuit 110 is configured as a single integrated circuit. In the bridge control circuit 110, a pulse width modulation (PWM) signal generator 111 generates a PWM signal and supplies the PWM signal to the H bridge circuit 20 based on a control of the bridge controller 108. A field effect transistor FET is bridged to the H bridge circuit 20, and the PWM signal supplied to the H bridge circuit 20 is an ON/OFF signal applied to the FET as a gate voltage.

Based on the PWM signal, the H bridge circuit 20 generates a motor voltage and applies the generated motor voltage to the stator winding wire 124 of the stepping motor 120. The motor voltage is actually an X-phase voltage VMX and a Y-phase voltage VMY illustrated in FIG. 1.

A current detector 113 outputs a current measurement value Icoil of a current flowing in the stator winding wire 124 by measuring a value of a current flowing in the H bridge circuit 20 in a current direction. A D/A converter 112 receives the reference current value Iref as a digital value from the bridge controller 108 and converts the digital value into an analog value. A comparator 114 compares the current measurement value Icoil as the analog value with the reference current value Iref. The comparator outputs a signal "1" when the former is equal to or greater than the latter, but outputs a signal "0" when the former is smaller than the latter. The comparison signal is input to the bridge controller 108. The bridge controller 108 can control the current measurement value Icoil to be closer to the reference current value Iref based on the comparison signal.

FIGS. 9A and 9B are diagrams illustrating a cause of vibration and abnormal noise in the comparative example.

FIG. 9A is a diagram illustrating a frequency modulation in the comparative example. A vertical axis in FIG. 9A indicates the vibration of the stepping motor 120 and a horizontal axis indicates a speed of the stepping motor 120. The vibration has a peak value due to resonance at the resonant frequency fr of the stepping motor 120. A frequency modulation graph of the speed of the stepping motor 120 is superimposed on a graph illustrated in FIG. 9A. In the graph, a downward direction indicates a time elapse and a lateral direction indicates a speed.

In the comparative example of FIG. 9A, the stepping motor 120 is rotated and frequency modulation is performed at a higher speed than the resonant frequency fr of the stepping motor 120 (referring to FIG. 2). At this time, when the speed of the stepping motor 120 increases, the vibration due to resonance decreases, and when the speed decreases, the vibration due to resonance increases. As a frequency of the frequency modulation belongs in an audible region, the variation in vibration is sounded as abnormal noise (beat sound).

FIG. 9B is a waveform chart illustrating frequency modulation of the comparative example. A vertical axis of FIG. 9B indicates the vibration of the stepping motor 120, and a horizontal axis indicates a time.

FIG. 9B illustrates that when the speed of the stepping motor 120 increases, the vibration due to resonance decreases and when the speed of the stepping motor 120 decreases, the vibration due to resonance increases.

An operation of the embodiment will be described with reference to FIGS. 3 to 8B. The motor drive controller 100 of the embodiment controls a current flowing in the stepping motor 120 in response to a rotation speed of the stepping motor 120 by the frequency modulation. As a result, it is possible to suppress abnormal noise or/and torque ripples.

Figure 3:
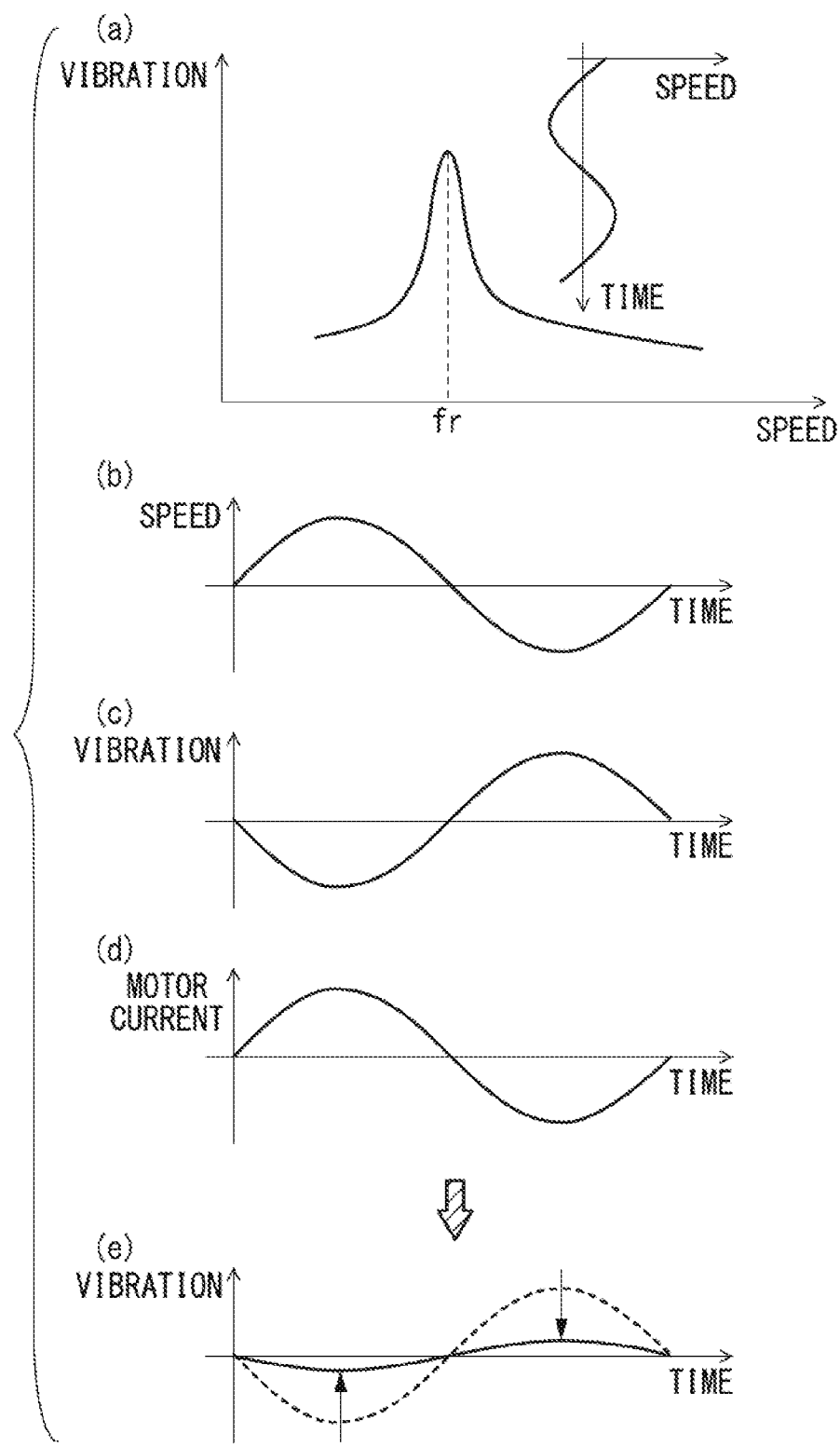
FIG. 3 is a diagram illustrating an operation of suppressing an abnormal noise when frequency modulation is performed at a higher speed range than a resonant frequency.

FIG. 3 is a diagram illustrating an operation of suppressing abnormal noise when frequency modulation is applied in a higher range than the resonant frequency fr.

Section (a) of FIG. 3 is a diagram illustrating frequency modulation. A vertical axis of section (a) of FIG. 3 indicates vibration of the stepping motor 120 and a horizontal axis indicates a speed of the stepping motor 120. The vibration has a peak value due to resonance at the resonant frequency fr of the stepping motor 120. A frequency modulation graph of the speed of the stepping motor 120 is superimposed on a graph illustrated in section (a) of FIG. 3. In the graph, a downward direction indicates a time elapse and a lateral direction indicates a speed.

Section (b) of FIG. 3 is a graph illustrating temporal variation of the speed with the frequency modulation. The speed of the stepping motor 120 varies in the form of a sine wave around a predetermined speed. All of origin vertical axis of sections (b)-(e) of FIG. 3 indicate a center value of the frequency modulation.

Section (c) of FIG. 3 is a graph illustrating a temporal variation in vibration as a whole by the frequency modulation when a motor current is set to be constant. By resonance, vibration of the stepping motor 120 varies with respect to a predetermined value in the form of a sine wave and with a reverse phase against the speed.

Section (d) of FIG. 3 is a graph illustrating temporal variation of an effective value of a motor current by the control according to the embodiment. In the embodiment, the effective value of the motor current of the stepping motor 120 is varied in the form of the sine wave and with the same phase as the speed. Here, the effective value of the motor current is controlled by the reference current value Iref. The effective value of the motor current can be controlled to vary in the form of the sine wave and with the same phase as the speed by varying a current gain for calculating the reference current value Iref in the form of the sine wave and with the same phase as the frequency modulation around a predetermined value (for example, 1.0).

Torque varies in proportion to the effective value of the motor current and vibration due to the torque varies. Therefore, by controlling the effective value of the motor current in the form of a sine wave and with the same phase as the speed, the vibration due to the torque can vary in the form of a sine wave and with the same phase as the speed and a variation of resonant vibration by the frequency modulation can be removed.

That is, as the speed of the stepping motor 120 by the frequency modulation becomes closer to the resonant frequency of the stepping motor 120, the current gain of the current gain table 105 is controlled to decrease so as to make an AC current flowing in the stepping motor 120 have a small effective value.

Since a predetermined speed at which the stepping motor 120 is driven is higher than the resonant frequency of the stepping motor 120, the current gain table 105 is configured such that the current gain increases as the speed of the stepping motor 120 increases. That is, the current gain table 105 is configured to include a table of current gain varying with the same phase as the frequency modulation.

Section (e) of FIG. 3 is a graph illustrating a suppression result of the variation in vibration as a whole by the control of the embodiment. A dashed line represents the variation in vibration when the motor current is set to be constant in section (c) of FIG. 3, and a solid line represents that variation in vibration as a whole is suppressed by the control according to the embodiment. According to the embodiment, it is possible to remove the temporal variation in resonant vibration by the frequency modulation using the variation in vibration due to the torque and thus to suppress abnormal noise.

Figure 4:
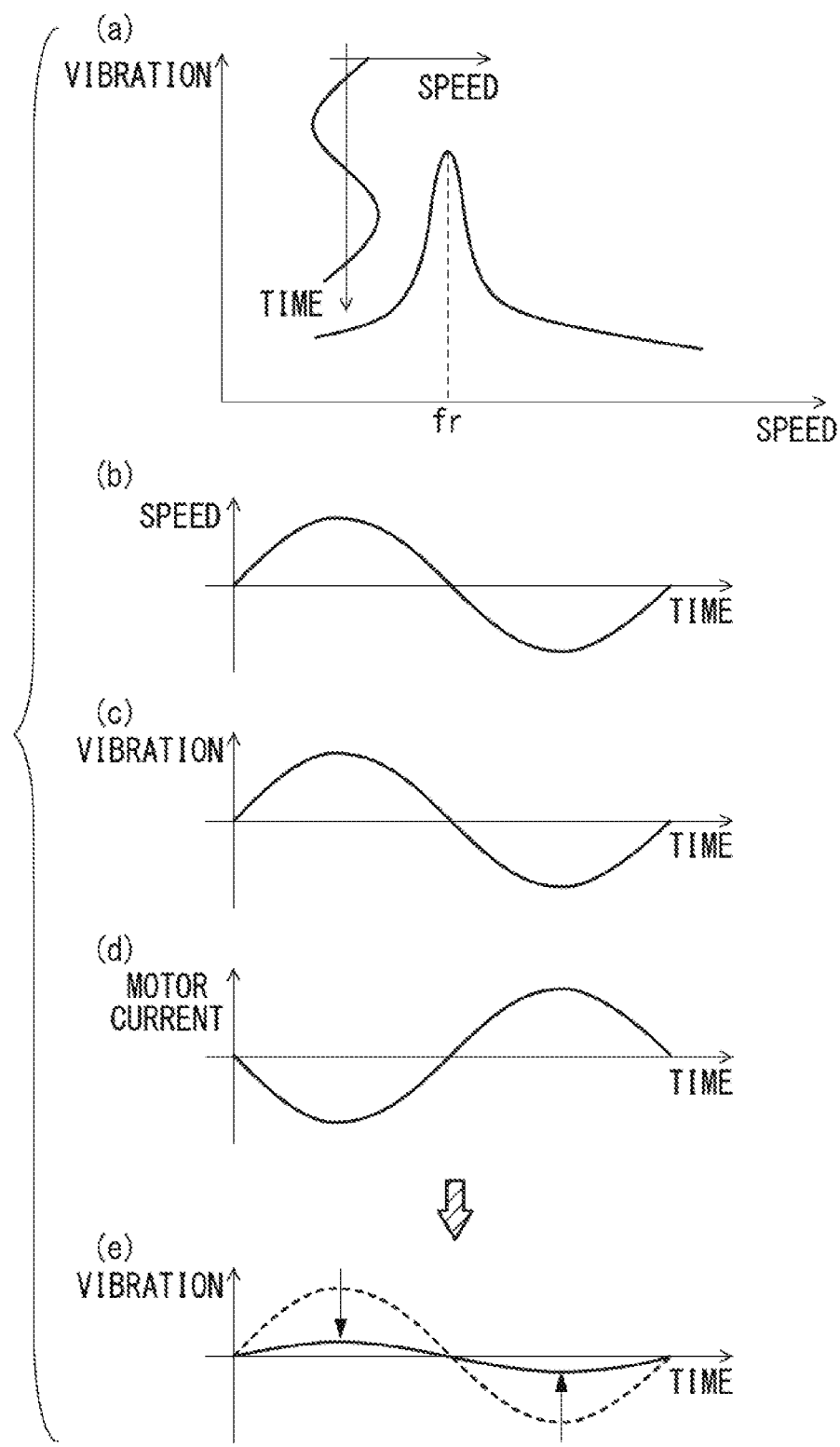
FIG. 4 is a diagram illustrating an operation of suppressing an abnormal noise when frequency modulation is performed at a lower speed range than a resonant frequency.

FIG. 4 is a diagram illustrating an operation of suppressing abnormal noise when the frequency modulation is performed in a lower range than the resonant frequency fr.

Section (a) of FIG. 4 is a diagram illustrating frequency modulation. A vertical axis of FIG. 4A indicates vibration of the stepping motor 120 and a horizontal axis indicates a speed of the stepping motor 120. The vibration has a peak value due to resonance at the resonant frequency fr of the stepping motor 120. A frequency modulation graph of the speed of the stepping motor 120 is superimposed on the graph illustrated in FIG. 4A. In the graph, a downward direction indicates a time elapse and a lateral direction indicates a speed.

Section (b) of FIG. 4 is a graph illustrating temporal variation of the speed with the frequency modulation. The speed of the stepping motor 120 varies in the form of a sine wave around a predetermined speed. All of origin vertical axis of sections (b)-(e) of FIG. 4 indicate a center value of the frequency modulation.

Section (c) of FIG. 4 is a graph illustrating a temporal variation in vibration by the frequency modulation when a motor current is set to be constant. By resonance, the vibration of the stepping motor 120 varies with respect to a predetermined value in the form of a sine wave and with the same phase as the speed.

Section (d) of FIG. 4 is a graph illustrating temporal variation of an effective value of a motor current by the control according to the embodiment. In the embodiment, the effective value of the motor current of the stepping motor 120 is varied in the form of the sine wave and with the reverse phase against the speed. Here, the effective value of the motor current is controlled by the reference current value Iref. The effective value of the motor current can be controlled to vary in the form of the sine wave and with the reverse phase against the speed by varying a current gain for calculating the reference current value Iref in the form of the sine wave and with the reverse phase against the frequency modulation around a predetermined value (for example, 1.0).

Torque varies in proportion to the effective value of the motor current and vibration due to the torque varies. Therefore, by controlling the effective value of the motor current in the form of a sine wave and with the reverse phase against the speed, the vibration due to the torque can vary in the form of a sine wave and with the reverse phase against the speed and the variation of resonant vibration by the frequency modulation can be removed.

That is, as the speed of the stepping motor 120 by the frequency modulation becomes closer to the resonant frequency of the stepping motor 120, the current gain of the current gain table 105 is controlled to decrease so as to make an AC current flowing in the stepping motor 120 have a small effective value.

At this time, since a predetermined speed at which the stepping motor 120 is driven is lower than the resonant frequency of the stepping motor 120, the current gain table 105 is configured such that the current gain decreases as the speed of the stepping motor 120 increases. That is, the current gain table 105 is configured to include a table of current gains varying with the reverse phase against the frequency modulation.

Section (e) of FIG. 4 is a graph illustrating a suppression result of a variation of total vibration by the control according to the embodiment. A dashed line represents variation of vibrations when the motor current is set to be constant in section (c) of FIG. 4, and a solid line represents that variation of the overall vibrations is suppressed by the control of the embodiment. According to the embodiment, it is possible to remove the temporal variation of the resonant vibration by the frequency modulation using the variation in vibration due to the torque and thus to suppress abnormal noise.

Figure 5:
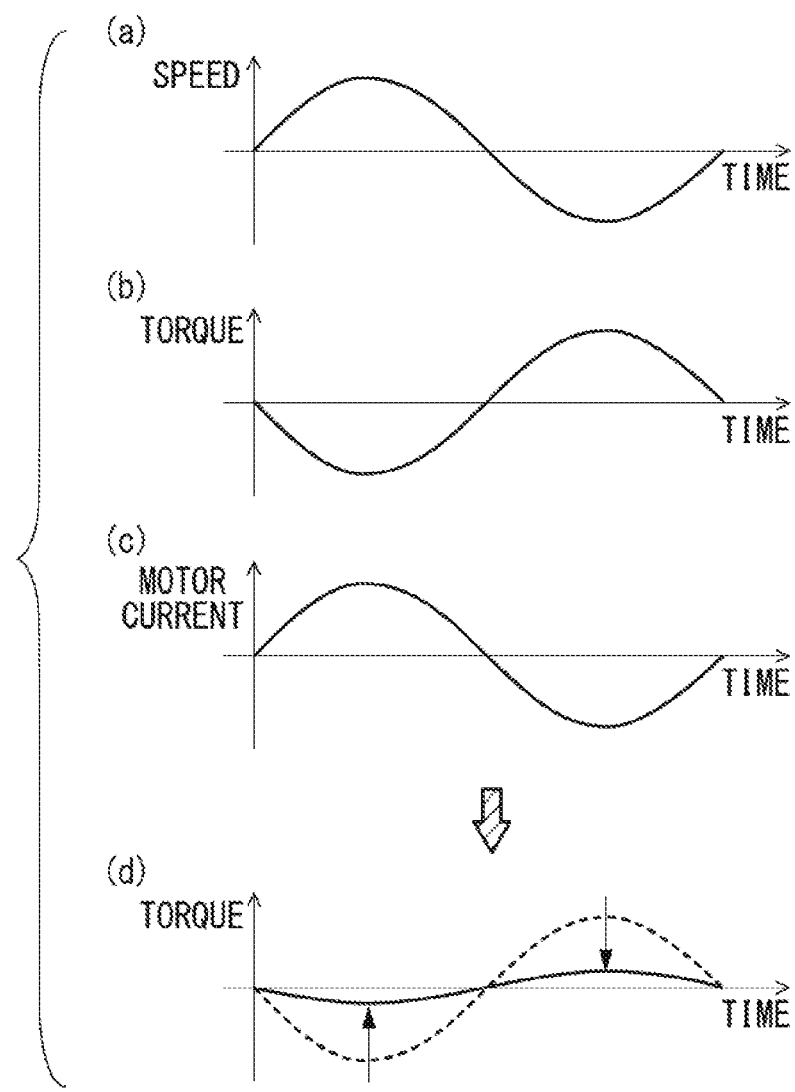
FIG. 5 is a diagram illustrating an operation of suppressing a torque variation.

FIG. 5 is a diagram illustrating an operation of suppressing torque variation with frequency modulation.

Section (a) of FIG. 5 is a graph illustrating a temporal variation of the speed by the frequency modulation. The speed of the stepping motor 120 varies in the form of a sine wave around a predetermined speed. All of origin vertical axis of sections (a)-(d) of FIG. 5 indicate a center value of the frequency modulation.

Section (b) of FIG. 5 is a graph illustrating temporal variation of torque with the frequency modulation when a motor current is set to be constant. As the speed of the stepping motor 120 increases, the torque decreases. But, as the speed of the stepping motor 120 decreases, the torque increases. That is, the torque of the stepping motor 120 varies with respect to a predetermined value in the form of a sine wave and with the reverse phase against the speed.

Section (c) of FIG. 5 is a graph illustrating a temporal variation of an effective value of a motor current by the control according to the embodiment. In the embodiment, the effective value of the motor current of the stepping motor 120 is varied in the form of the sine wave and with the same phase as the speed. Here, the effective value of the motor current can be controlled to vary in the form of the sine wave and with the same phase as the speed by varying a current gain for calculating the reference current value Iref in the form of the sine wave and with the same phase as the frequency modulation around a predetermined value (for example, 1.0).

Torque varies in proportion to the effective value of the motor current. Therefore, by controlling the effective value of the motor current in the form of a sine wave and with the same phase as the speed, the torque can vary in the form of a sine wave and with the reverse phase against the speed and a variation in torque by the frequency modulation can be removed.

That is, the current gain table 105 includes a table of current gains varying with the same phase as the speed of the stepping motor 120 by the frequency modulation. As a result, the effective value of the motor current can be controlled to vary in the form of a sine wave and with the same phase as the speed.

Section (d) of FIG. 5 is a graph illustrating a suppression result of a variation in vibration as a whole by the control according to the embodiment. A dashed line represents the variation in vibration when the motor current is set to be constant in section (b) of FIG. 5, and a solid line represents that the variation in vibration as a whole is suppressed by the control of the embodiment. According to the embodiment, it is possible to remove variation of the torque with the frequency modulation by using variation of the torque based on the effective value of the motor current and thus to suppress torque ripples.

Figure 6:
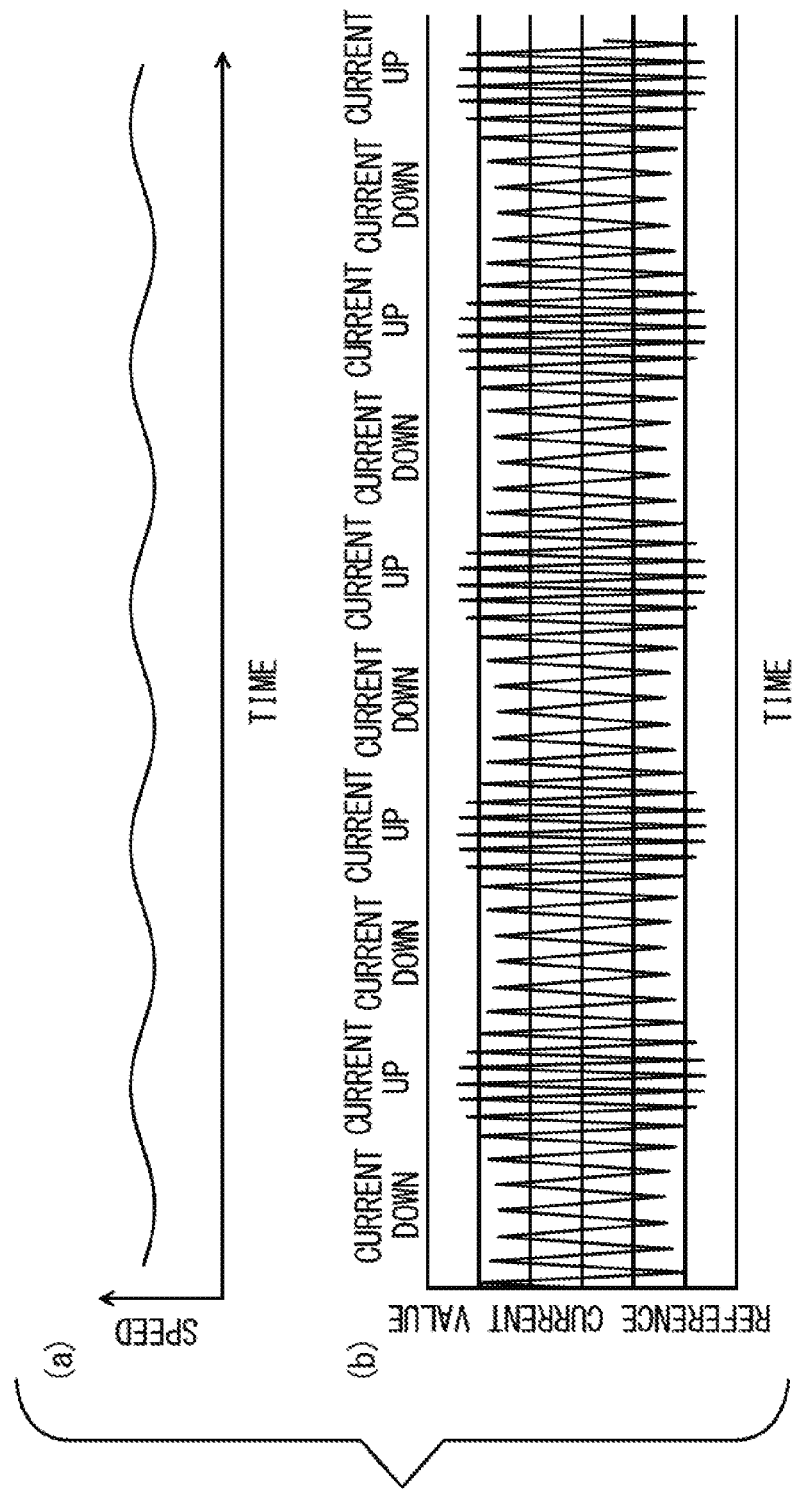
FIG. 6 is a waveform diagram illustrating a relationship between a frequency modulation and a reference current value.

FIG. 6 is a waveform chart illustrating relationship between the frequency modulation and a reference current value Iref. At this time, the speed of the stepping motor 120 is higher than the resonant frequency fr.

A vertical axis of section (a) of FIG. 6 indicates a speed, and a horizontal axis indicates common time. The speed of the stepping motor 120 varies in the form of a sine wave around a predetermined value.

A vertical axis of section (b) of FIG. 6 indicates a reference current value Iref, and a horizontal axis indicates common time. An envelope of the reference current value Iref of the stepping motor 120 varies in the form of a sine wave and with the same phase as the speed. Here, the envelope of the reference current value Iref indicates an effective value of a motor current.

When an amplitude of the envelope of the reference current value Iref is small, the reference current value Iref decreases, but when the amplitude of the envelope of the reference current value Iref is great, the reference current value Iref increases. A variation in vibration can be suppressed using the control method.

Figure 7:
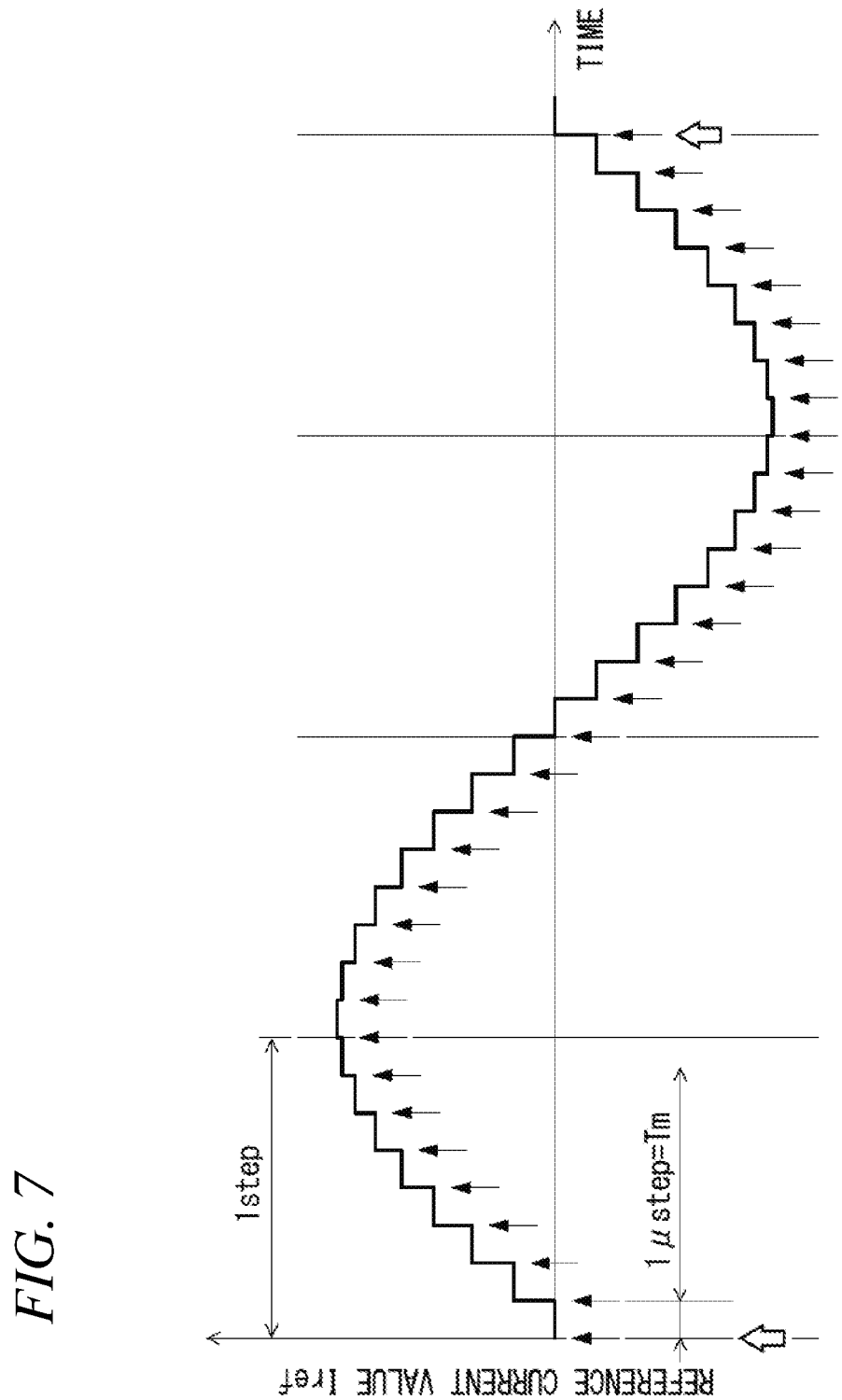
FIG. 7 is a diagram illustrating an example of the reference current value in which one period is divided into 32 sections.

FIG. 7 is a diagram illustrating an example of the reference current value Iref of each micro step in which 1 period is divided into 32 sections. A vertical axis of FIG. 7 indicates a reference current value Iref, and a horizontal axis indicates time. 1 period is divided into 32 micro steps. The reference current value Iref has a sinusoidal form.

Every period Tm of micro steps becomes current setting timing illustrated in thin arrows. Every period becomes frequency modulation timing illustrated in thick arrows.

Figure 8A:
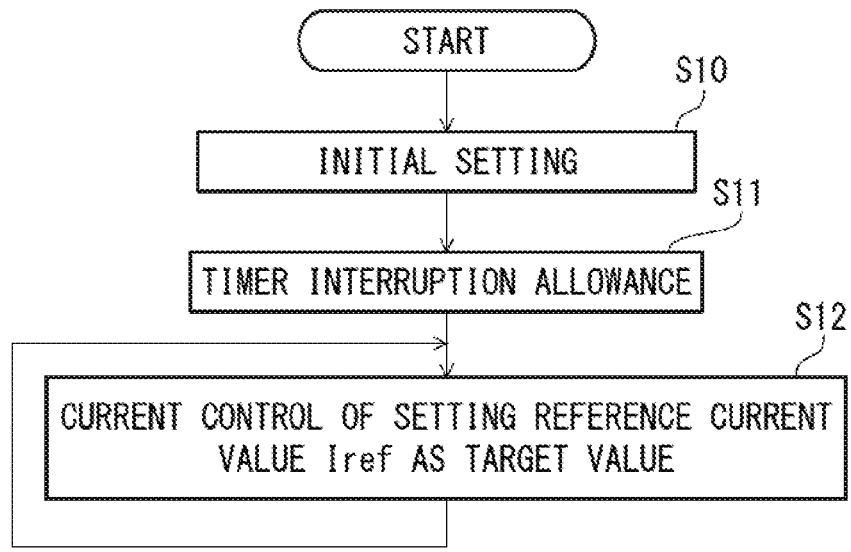
FIGS. 8A and 8B are flowcharts illustrating a control process and a setting process of the reference current value according to the embodiment.
Figure 8B:
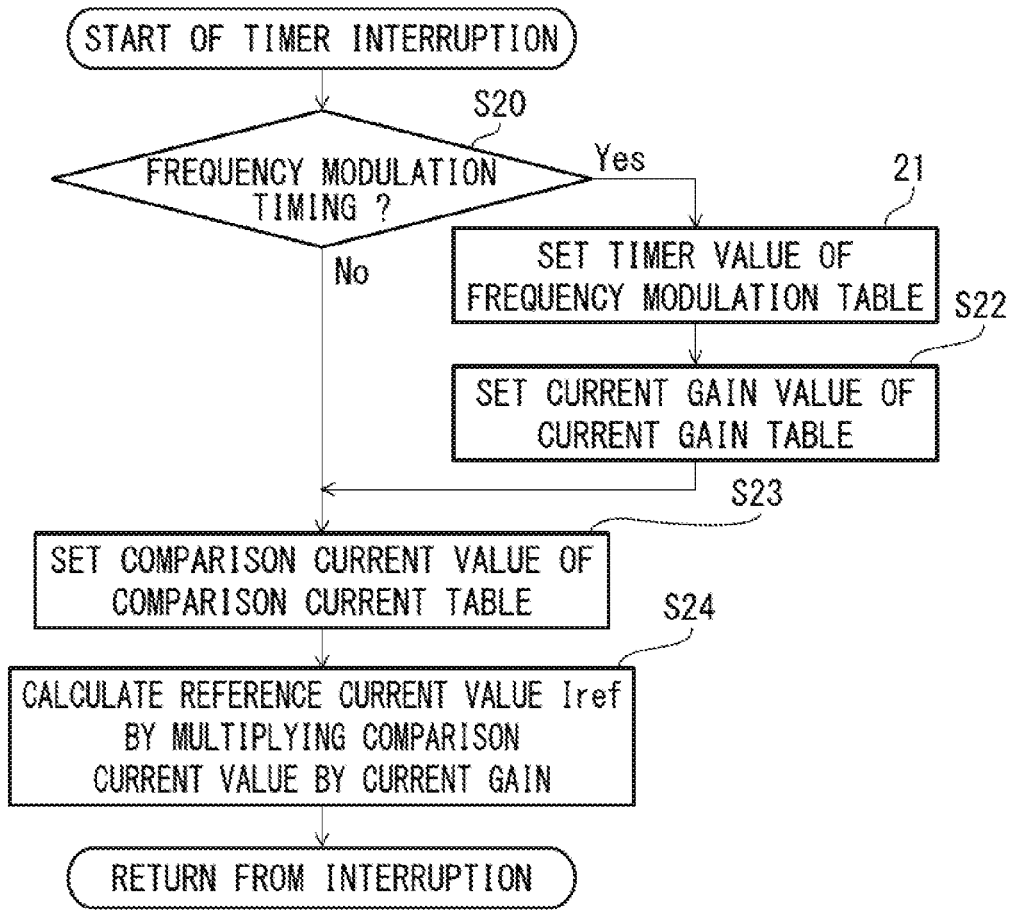

FIGS. 8A and 8B are flowcharts illustrating a control process and a process of setting the reference current value Iref according to this embodiment.

FIG. 8A indicates a control process of the reference current value Iref in a main routine.

The main routine starts when the motor drive controller 100 is activated.

The CPU 101 of the motor drive controller 100 performs initial setting of the units in step S10, and allows an interruption of the timer 102 in step S11. In the timer 102, an initial micro step period of the frequency modulation table 106 is set. As a result, the timer interruption illustrated in FIG. 8B is activated.

Then, the CPU 101 repeats the current control of controlling the reference current value Iref to be a target value in the bridge controller 108. The reference current value Iref is set by the timer interruption.

FIG. 8B illustrates a process of setting the reference current value Iref by the timer interruption. The reference current value Iref is set by the timer interruption and thus a micro step starts.

When the timer interruption is activated, the CPU 101 determines whether it is a frequency modulation timing or not in step S20. As illustrated in FIG. 7, the frequency modulation timing in this embodiment arrives once a period and once per 32 micro steps. When it is determined that it is a frequency modulation timing (YES in step S20), the CPU 101 performs the processes of steps S21 and S22 relevant to the frequency modulation timing.

In step S21 relevant to the frequency modulation timing, the CPU 101 causes the timer 102 to set a period of the next micro step from the frequency modulation table 106, sets a current gain of the present micro step from the current gain table 105 (step S22), and then performs the processes of steps S23 and S24 relevant to the current setting timing.

In step S20, when it is determined that it is not a frequency modulation timing (NO in step S20), the CPU 101 performs the processes of steps S23 and S24 relevant to the current setting timing.

In step S23 relevant to the current setting timing, the CPU 101 sets a comparison current value of the present micro step of the comparison current table 104, multiplies the comparison current value by a current gain to calculate the reference current value Iref (step S24), and returns to the original process.

In the embodiment, when the motor is rotated by a faster speed than the resonant frequency fr of the motor, the motor current is controlled to be greater than the comparison current value as the rotation speed is increased by the frequency modulation. The motor current is controlled to be smaller than the comparison current value as the rotation speed is decreased.

When the motor is rotated by a slower speed than the resonant frequency fr of the motor, the motor current is controlled to be smaller than the comparison current value as the rotation speed is increased by the frequency modulation. The motor current is controlled to be greater than the comparison current value as the rotation speed is decreased.

That is, the motor current is controlled to be smaller than the comparison current value in response to the rotation speed as the rotation speed becomes closer to the resonant frequency fr by the frequency modulation, and the motor current is controlled to be greater than the comparison current value in response to the rotation speed as the rotation speed gets separated away from the resonant frequency fr. As a result, vibration ripples can be suppressed and thus the abnormal noise (beat sound) can be reduced. Because the vibration ripples of the motor can be suppressed, it is possible to suppress vibration and noise of an actuator in which the motor is mounted.

The motor current is controlled to be greater than the comparison current value in response to the rotation speed as the rotation speed is increased by the frequency modulation, and the motor current is controlled to be smaller than the comparison current value in response to the rotation speed as the rotation speed is decreased.

Through this control, the torque ripples can be reduced. Since the torque ripples can be suppressed, it is possible to stably rotate a load attached to the motor.

The present invention is not limited to the above-mentioned embodiment and can be modified in various forms without departing from the gist of the present invention. For example, Modified Examples (a) to (e) described below can be considered.

(a) In the embodiment, current setting of the motor is performed in the same timing as setting of the frequency modulation of the speed of the motor, but may be performed in a separate timing.

(b) The processes of steps S21 and S22 performed in the frequency modulation timing may be performed every predetermined period without limiting to 1 period. For example, processes of the steps S21 and S22 may be performed every two period. The current setting timing is not limited to 32 times a period. The times can be arbitrarily set.

(c) In the embodiment, while being controlled by the frequency modulation table 106 and the current gain table 105, numerical values of the frequency modulation or the current gain may be derived by a calculation.

(d) In the embodiment, different operations are performed depending on whether the speed is higher than the resonant frequency fr of the stepping motor 120 or not. However, the present invention is not limited thereto and it may be determined whether the speed is higher than the resonant frequency fr of the stepping motor 120 or not and a corresponding current gain table 105 may be selected and used.

(e) In the embodiment, while the frequency modulation having a sinusoidal waveform is applied to the motor speed and a current setting having the sinusoidal waveform synchronized thereto is performed, the current setting may have any of the vibration waveform and is not limited to the sinusoidal waveform as long as the motor speed is synchronized to the motor current.

As described in the above with reference to the embodiment and modified examples, according to the present invention, it is possible to suppress abnormal noises or torque ripples generated in periodically modulating a driving frequency of the stepping motor.

What is claimed is:

1. A motor drive controller comprising:
a control circuit that controls an AC current flowing in a stepping motor;
a processor configured to control the motor drive controller including the control circuit; and
a memory that stores instructions for the processor, the instructions, when executed by the processor, causing the motor drive controller to:
control, when instructed to drive the stepping motor at a predetermined speed, a speed of the stepping motor so that the speed of the stepping motor periodically varies around the predetermined speed by frequency modulation;
decrease, in response to the periodic variation of the speed of the stepping motor by the frequency modulation, an effective value of the AC current flowing in the motor as the speed of the stepping motor becomes closer to a resonant frequency of the stepping motor; and
increase, in response to the periodic variation of the speed of the stepping motor by the frequency modulation, the effective value of the AC current as the speed of the stepping motor gets separated away from the resonant frequency of the stepping motor,
wherein the AC current and the variation of the stepping motor around the predetermined speed have the same period.

2. The motor drive controller according to claim 1,
wherein the instructions, when executed by the processor, further cause the motor drive controller to:
determine whether the predetermined speed at which the stepping motor is driven is higher than the resonant frequency of the stepping motor; and
decrease, when it is determined that the predetermined speed at which the stepping motor is driven is higher than the resonant frequency of the stepping motor, the effective value of the AC current flowing in the stepping motor to suppress a variation in vibration of the stepping motor as the speed of the stepping motor decreases.

3. The motor drive controller according to claim 2,
wherein the memory further stores:
a frequency modulation table that indicates a sequence of values for each period of micro step for controlling the stepping motor, and
a current gain table that indicates a sequence of current gain values that vary with the same phase as that of the frequency modulation.

4. The motor drive controller according to claim 1,
wherein the instructions, when executed by the processor, further cause the motor drive controller to:
determine whether the predetermined speed at which the stepping motor is driven is lower than the resonant frequency of the stepping motor; and
increase, when it is determined that the predetermined speed at which the stepping motor is driven is lower than the resonant frequency of the stepping motor, the effective value of the AC current flowing in the stepping motor to suppress a variation in vibration of the stepping motor as the speed of the stepping motor decreases.

5. A method for controlling a stepping motor, the method comprising:
controlling, when instructed to drive the stepping motor at a predetermined speed, a speed of the stepping motor so that the speed of the stepping motor periodically varies around the predetermined speed by frequency modulation;

decreasing, in response to the periodic variation of the speed of the stepping motor by the frequency modulation, an effective value of an AC current flowing in the stepping motor as the speed of the stepping motor becomes closer to a resonant frequency of the stepping motor; and increasing, in response to the periodic variation of the speed of the stepping motor by the frequency modulation, the effective value of the AC current as the speed of the stepping motor gets separated away from the resonant frequency of the stepping motor, wherein the AC current and the variation of the stepping motor around the predetermined speed have the same period.

\* \* \* \* \*